Jan. 31, 1967   R. W. BIDWELL   3,301,996
ARC WELDING THIN METAL
Filed June 28, 1963
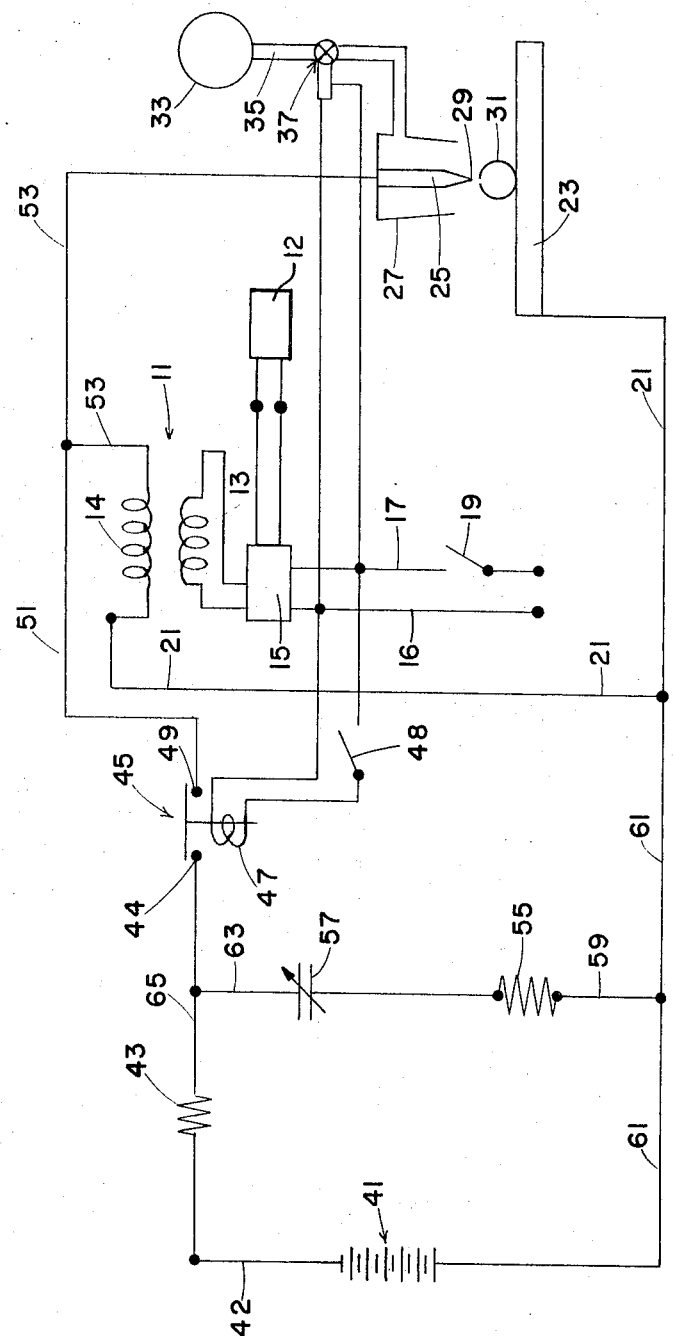
INVENTOR.
ROBERT W. BIDWELL
BY
*Robert W. Ely*
ATTORNEY

3,301,996
ARC WELDING THIN METAL
Robert W. Bidwell, Rome, N.Y., assignor to The Bendix Corporation, Utica, N.Y., a corporation of Delaware
Filed June 28, 1963, Ser. No. 291,434
2 Claims. (Cl. 219—127)

This invention relates to arc welding and more particularly concerns inert-gas-shielded welding using a non-consuming electrode.

In the tack welding of the facing or perpendicularly-arranged edges of tubular or arcuate and radially-extending thin metal parts, it was found that conventional welding methods and apparatus were not always satisfactory. The reliability was dependent on, and adversely affected by, several factors including operator inconsistency, the connection between the work piece and the ground via a fixture or work table, the inaccuracy of a conventional D.C. welding source when set at the lower range and the timing device for the welding current switch. Due to these factors and the thin metal sections involved, "burn-out" often occured or a sound weld did not result.

An object of the present invention is to provide a simple, inexpensive method for improved consistent tack welding of thin metal sections with the use of an inert-gas-shielded, non-consuming electrode whereby the noted disadvantages are overcome.

A further object is the provision of an improved, inexpensive combination of apparatus for such tack welding of thin metal sections wherein a capacitance discharges through the ionized path of an inert gas between a non-consuming electrode and the thin metal sections to give a desired weld penetration.

An additional object is to provide such apparatus in which a capacitance is isolated from the welding circuit and suitably recharged and, if desired, the ionizing means is interrupted while the work piece is repositioned.

The realization of the above objects along with the features and advantages of the invention will be apparent from the following description and the accompanying drawing.

The diagrammatic drawing shows parts of a conventional welding system having a non-consuming electrode and means for ionizing the inert gas shield around the electrode and further shows a condenser or capacitance, a D.C. source and resistance combined therewith to provide improved tack welding of thin work pieces.

Referring to the drawing, a conventional high frequency, high voltage, low current probe means or pilot arc unit 11 is provided and includes the primary or low voltage winding 13, the secondary or high voltage winding 14, a control relay 15, and wires from relay 15 which are connected to a high frequency, low voltage source 12. Wires 16 and 17 lead from relay 15 to a standard 110 volt, 60 cycle source. Wire 17 includes the normally-open, main control switch 19. The left lead 21 from the H.V. winding 14 extends to work table 23 while the right lead 53 connects to the non-consuming electrode 25. The small-diameter, tungsten electrode 25 (shown enlarged) is surrounded by an inert-gas-shield-forming device 27 which provides an inert gas shield around the tip 29 of the electrode 25 and the thin-walled work piece 31 so that air is excluded from the weld area. Helium and/or argon is provided to the gas-shield-forming device 27 from bottle 33 via pipe 35 having a quick-opening, solenoid valve 37 which is connected to wires 15 and 17. The foregoing comprises (except for the welding current means) an inert-gas-shielded, non-consuming electrode, welding set-up having a high voltage initiating arc for ionizing a path for the welding current through the inert gas shield to the weld piece. The work piece 31 is shown with two sections of a tubular element in facing edge relation to be joined. In practice, the edges are in abutment. Three thin sections (two facing arcuate sections and a radially-extending or vertical flat spring section in the opening) have been joined by the tack welding method of the present invention. In both arrangements, thin metal abutting edge sections (either facing or perpendicularly arranged) are joined advantageously by the present invention with suitable penetration. Ground connection is made along the axially-extending surface by a collet device (not shown).

The means for supplying the brief, low voltage welding current to the thin edge sections to be joined is derived from a battery 41 or, preferably, another more accurate, A.C.-energized, direct-current source at the left having lead 42. A blocking resistance 43 is connected to negative battery lead 42 and to contact 44 of normally-open, welding current switch 45 having its solenoid 47 connected to wires 15 and 17 through welding control foot switch 48. Switch contact 49 of switch 45 is suitably connected into the pilot arc circuit, for example, as shown wherein wire 51 is joined to the right lead 53 of high voltage winding 14 which connects to electrode 25. A discharge limiting resistor 55 and a welding current, capacitor bank 57 in series are connected across the D.C. source 41 by lower resistor lead 59 being connected into the positive battery lead 61 and by upper capacitor lead 63 being connected to wire 65, extending between resistor 43 and switch contact 44. Lower lead 61 of the D.C. source 41 connects at the right to the HV circuit between HV winding 14 and work table 23 or an end-clamping fixture (not shown). Assuming the closing of master control switch 19 and the generation of an ionized path by the HV circuit between the electrode 25 and the work to be welded 31, it is apparent that a capacitor-derived, short-duration current is superimposed on the HV circuit. The variable capacitor 57 is recharged by the subcircuit including the D.C. source 41 and limiting and blocking resistors 43 and 55. Resistor 43 serves or functions to limit the charging rate of the capacitor 57 so as not to exceed the amperage rating of the D.C. power supply 41 and also prevents the D.C. source from supplying any effective welding current. Resistor 55 is sufficient to limit the discharge rate of the capacitor 57 to give suitable peak amperes and to avoid an undesirable high initial surge while permitting a relatively high discharge for brief duration of time.

In operation, the two edge sections of a tubular work piece 31 which are in abutment (though shown spaced for clarity) are placed under the pointed tip 29 of the small-diameter electrode 25 with an appropriate arc gap. The tubular work piece 31 is shown on the grounded work table 23 to suggest adequate grounding which is actually provided by fixtures (not shown). Switches 19, 48 and 45 are normally open, while valve 37 is closed. Before welding, the capacitor 57 will be charged by source 41 at a rate as limited by resistors 43 and 55.

Upon closing master control switch 19, HV relay 15 will be closed and valve 37 will be opened to provide simultaneously and respectively an ionizing pilot arc or ionized path and an inert gas shield or blanket at electrode tip 29 and the edge sections of the work piece 31. As soon as the H.V. circuit provides an ionized path and switch 48 is closed, the capacitor 57 discharges as limited by resistor 55 for short time interval to give a localized tack weld without significant heating a slight distance from the electrode. Resistor 43 effectively blocks any significant current flow from D.C. source through current switch 45 and the welding circuit so that no effective welding current is derived from the D.C. source.

Next, the foot switch 48 is operated to open current switch 45 and the work piece 31 is moved for making the next tack weld. The brief opening of switch 45 isolates the capacitor circuit and permits the recharging as limited by the two resistors 43 and 45. Alternatively, switch 19 can be opened if the HV circuit interferes and/or if it is desired to conserve the inert gas. Switch 19 is preferably opened when a new work piece is to be welded. The closing of switch 45 by either mode results in the ionizing HV arc permitting the discharge of capacitor 57. It is to be noted that resistor 55 limits the initial and subsequent discharge to an amperage value which is suitable for localized, relatively-deep tack welding of thin metal material. It is to be understood that the polarity of the welding circuit would be reversed in dependence on the material to be welded and that ionizing molecules or a D.C. pilot arc can be used in some instances.

For the reliable, consistent welding of thin metal sections having a weld location thickness of about 0.0013 (radial) to 0.0210 (flat or arcuate) of an inch and being made from a corrosion-resistant steel (AISI #410 or #420), the following values or dimensions are proportionately specified for the indicated metal penetration dimensions at tack weld location below the electrode:

|  | (1) 0.014 | (2) 0.017 | (3) 0.021 |
| --- | --- | --- | --- |
| Electrode (25) diameter (inches) | 1/32 | 1/16 | 3/32 |
| Capacitor (57) (MFD) | 15,000 | 30,000 | 50,000 |
| Maximum Welding Current (amperes) | 100 | 150 | 200 |

The D.C. source (30 volts, 10 amperes) was not varied. Resistors 43 and 55 respectively were 10 and 0.1 ohms. The welding or discharge time was less than 10 milliseconds. The resulting penetration from the brief, peak-limited discharge was 50–75% of the noted weld location dimension. The spark gap was about 3/64 of an inch. The improved, consistent method and simple, relatively low cost apparatus of the present invention were particularly successful in the end part tack welding of the intermediately-fabricated core assembly of flexural pivots, such as disclosed in U.S. Patent No. 3,124,873 (assigned to the assignee of this application). It is to be noted that the capacitor is isolated during charging by manual means which permits repositioning, that a non-variable resistance limits the discharge, that the D.C. source is constantly blocked out during capacitor welding and that other advantageous features exist which are not found in complicated prior art means, such as disclosed in U.S. Patent No. 2,235,385.

It is to be understood that persons skilled in the art can make changes in the described method and apparatus without departing from the invention as set forth in the following claims.

What is claimed is:
1. Welding apparatus for joining thin metal elements by spot-like tack welds comprised of:
   a grounded work holding device,
   a non-consuming electrode having an inert gas shielding device,
   ionization circuit means constructed and arranged to provide a high frequency, high voltage, low current connected to said electrode,
   a circuit connecting said ionization circuit means, said electrode and said device,
   a direct current power source,
   variable capacitance means connected to said direct current source by a charge circuit including a resistance for the charging thereof,
   normally-open switch means for controlling said ionization circuit mean,
   a welding current circuit connecting said capacitance means to said work holding device and said electrode,
   said welding current circuit including welding switch means and discharge limiting resistance means,
   said discharge limiting resistance means being such as to limit the discharge of said capacitance means to provide a welding current suitable for welding thin metal elements,
   said charge circuit resistance being such as to permit the charging of said capacitance means by said direct current source and to prevent a significant current flow from said direct current source to said welding circuit.

2. Welding apparatus for welding thin steel metal sections having a thickness of about 0.014 to 0.021 of an inch comprised of:
   a D.C. source of 30 volts and 10 amperes having a positive terminal and a negative terminal,
   a condenser having first and second plate means connected respectively to said negative and positive terminals by means including respectively a first resistor and a second resistor,
   said condenser being constructed to have a value of 15,000 to 50,0000 m.f.d.,
   a high voltage, high frequency, low current source,
   a tungsten electrode having means to provide an inert gas shield around said electrode,
   a work holding device and said electrode being connected in series to said high voltage source,
   said high voltage source being adapted to provide an ionized path through the inert gas shield from said electrode to said thin metal sections when grounded through said work holding device,
   said electrode and said working holding device being connected to said condenser through said second resistor by a circuit including a manually-operable switch,
   said first resistor being such as to block the D.C. source and to limit the charging of the condenser to within the D.C. source amperage rating, and
   said second resistor having a value adapted to limit the initial discharge of said condenser to 100–200 amperes.

References Cited by the Examiner
UNITED STATES PATENTS

| 2,235,385 | 3/1941 | Rava | 219—131 |
| 2,395,600 | 2/1946 | Weisglass | 320—1 X |
| 2,685,668 | 8/1954 | Ameele et al. | 320—1 |
| 2,814,715 | 11/1957 | Blackman | 219—135 X |
| 2,853,593 | 9/1958 | Albrecht | 219—113 |
| 3,002,084 | 9/1961 | Sullivan | 219—127 |

JOSEPH V. TRUHE, *Primary Examiner.*